United States Patent [19]
Hongu

[11] Patent Number: 5,491,564
[45] Date of Patent: Feb. 13, 1996

[54] DATA COMPRESSION METHOD AND APPARATUS FOR BINARY IMAGE USING MARKOV MODEL ENCODING

[75] Inventor: Takahiro Hongu, Tokyo, Japan

[73] Assignee: NEC Corporation, Tokyo, Japan

[21] Appl. No.: 202,070

[22] Filed: Feb. 25, 1994

[30] Foreign Application Priority Data

Feb. 26, 1993 [JP] Japan ................................. 5-037979

[51] Int. Cl.[6] ............................. H04N 1/41; H04N 1/417; G06T 9/00; G06T 9/20
[52] U.S. Cl. ......................... 358/429; 358/430; 358/462; 358/467; 382/238; 382/239; 382/237; 382/176
[58] Field of Search ...................... 358/426, 429, 358/430, 261.2, 467, 462; 382/56, 238, 339, 232, 237, 176; 341/51

[56] References Cited

U.S. PATENT DOCUMENTS

| | | |
|---|---|---|
| 4,194,221 | 3/1980 | Stoffel . |
| 4,494,108 | 1/1985 | Langdon et al. ........................ 341/51 |
| 5,151,949 | 9/1992 | Miyata ................................. 382/238 |

FOREIGN PATENT DOCUMENTS 0215229  3/1987  European Pat. Off. .

OTHER PUBLICATIONS

"Review of standards for electronic imaging for facsimile systems", by S. J. Urban, Journal of Electronic Imaging, vol. 1, No. 1, Jan. 1992, pp. 19–20.

*Primary Examiner*—Scott A. Rogers
*Attorney, Agent, or Firm*—Sughrue, Mion, Zinn, Macpeak & Seas

[57] ABSTRACT

A method and an apparatus for data compression suitable for the Markov model coding of mixed bunary images including documents, diagrams, halftone images and photograghs. The method is consisted of the first step of calculating an image statistic from an input binary image, the second step of performing area classification of the input binary image according to the image statistic and preparing area classification data and the third step of producing reference data to be used in the Markov model encoding. The reference data is composed of a first data portion corresponding to the area classification data and a second data portion having a data portion other than the first data portion. The apparatus has an image statistic calculation part for calculating the image statistic, an area classification part for performing the area classification and a reference data preparation part for preparing the reference data.

13 Claims, 9 Drawing Sheets

DATA COMPRESSION METHOD AND APPARATUS FOR BINARY IMAGE USING MARKOV MODEL ENCODING

BACKGROUND OF THE INVENTION

1. Field of the Invention

The present invention relates to a method and an apparatus for binary image coding, and particularly to a method and an apparatus for data compression to be executed with reference to mixed binary images including documents, paintings, calligraphic works, diagrams, halftone images and photographs.

2. Description of the Related Art

An MH (Modified Huffman) coding method or an MR (Modified READ, Modified Relative Element Address Designate) coding method applied in the G3 facsimile industry is known as a typical coding method for binary images in which each pixel is represented by numeral 0 or 1. These methods are established by CCITT (Comité Consultatif Internationale de Télégraphique et Téléphonique, International Telegraph and Telephone Consultative Committee) as international standards. Although the MH coding and the MR coding are suitable for use in facsimile transmission of business documents, their function is not satisfactory for executing the high definition transmission of mixed binary images which includes text, diagrams, halftone images or photographs, and is not appropriate for displaying images on the user's terminal when it is necessary in such operations as image data base retrieval.

Therefore, a JBIG (Joint Bi-Level Image coding experts Group) method has been proposed for a coding system as an international standard which deals with binary static image data and which can encode the data with a high compression rate even when the data includes mixed texts, diagrams, halftone images or photographs, and can also perform the progressive display on the user's terminal. A binary image data compression apparatus according to the JBIG coding method is composed of, in brief, a modeling part for performing modeling activity according to the binary Markov model which refers to 10 pixels surrounding a current pixel to be encoded and an encoder for performing entropy encoding. As for entropy encoding, an arithmetic encoding method is employed. It was decided to use a QM code (hereinafter referred to as the QM-Code) developed based on the Q code and Mel code as a standard code. The JBIG method will be further described below with reference to FIGS. 1 and 2.

FIG. 1 illustrates a conventional binary image data compression apparatus according to the JBIG method. The figure shows the input binary image scanning in progress by a raster scanning method which scans the image pixel by pixel from the upper left of the image. In FIG. 1, $x_{i,j}$ represents a pixel (attentional pixel) to be inputted to the j-th place on the i-th line. This apparatus comprises a correlation calculation part 91 for calculating correlation between images, a pixel displacement position decision part 92 for displacing a pixel which has a strong correlation with the attentional pixel to a related position, a reference data preparation part 93 for preparing reference data to be used in Markov model encoding activity and a QM coder 94 for practically performing encoding of the data and outputting encoded output signals. When the attentional pixel $x_{i,j}$ is encoded by the QM coder 94, the Markov model encoding is performed in this apparatus based on the reference data to be outputted from the reference data preparation part 93. Also in this activity, 10 pixels in the neighborhood of the attentional pixel to be encoded (10 nearby pixels) are used as the reference data for performing the Markov model encoding. FIG. 2 illustrates the positional relationship between the attentional pixel $x_{i,j}$ and the 10 pixels near the attentional pixel. This apparatus is arranged so as to be able to select only one pixel of the reference data for changing the pixel position depending on the degree of correlation between images. According to a position changing method, a pixel to be referred to located at position A of FIG. 2 is moved to a position of another pixel selected from among pixels having a strong correlation with the attentional pixel. More particularly, one of the pixels to be referred to for the Markov model encoding of the attentional pixel is changed from the pixel at A of FIG. 2 to another pixel which has a strong correlation with the attentional pixel by the pixel displacement position decision part 92 depending on data computed by the correlation calculation part 91 using the data of peripheral pixels. The substituted pixel is referred to for the encoding together with the remaining 9 pixels of the above 10 nearby pixels. However, the information of the pixel position concerned with displacement needs to be transmitted from an encoder to a decoder.

The conventional JBIG method for applying the Markov model encoding based on the QM-code has the following problems:

(1) Since the Markov model encoding utilizes 10 nearby pixels as reference data, the compression efficiency of binary images is high when the binary images are documents, calligraphic works or diagrams, but the compression efficiency falls to a low level when pseudo-halftone images are produced by an error diffusion method.

(2) In the Markov model encoding, the position of only one pixel among the 10 nearby pixels of the reference data is allowed to shift to another position having a strong correlation with the attentional pixel, but this process is unsatisfactory for an image in which binary image data has a specific period such as a halftone image or a pseudo-halftone image produced by the ordered dither method. More particularly, in the case of binary image data having the specific period as described above, several pixels spaced by the specific period from the attentional pixel $x_{i,j}$ each have the same strong correlation with the attentional pixel, with the result that the displacement of only one pixel position is unsatisfactory for this case.

(3) With respect to the reference data, the relative position of the substituted pixel with the attentionl pixel can be changed for each line of the image data and cannot be channged within the same line. However, when there is a combination of documents and pseudo-halftone images involved in the binary images, it is common for the above documents and pseudo-halftone images to be mixed on the same line. In this case, it is impossible to change the pixel position of the reference data.

(4) When a pixel position is changed, in order to obtain the position to which the pixel is displaced, it is necessary to calculate the correlation of the pixel with surrounding pixels or the Markov model entropy of the pixel. Since these operations entail a huge amount of calculation requiring additional memory with a large capacity for temporary storage of data, the practical application of such a method necessitates a large and costly system.

SUMMARY OF THE INVENTION

An object of the present invention is to provide a method for performing highly efficient data compression of all types of binary image data, including mixed images.

Another object of the present invention is to provide an apparatus for performing highly efficient data compression of all types of binary image data, including mixed images.

The object of the present invention is achieved by employing a binary image data compression method which comprises a first step for calculating an image statistic from an input binary image, a second step for performing area classification of the input binary image according to the image statistic and preparing area classification data of the input binary image, and a third step for producing reference data to be used in the Markov model encoding, wherein the reference data is composed of a first data portion corresponding to the area classification data and a second data portion which includes the data other than the data of the first data portion.

Another object of the present invention is achieved by employing a binary image data compression apparatus which comprises image statistic calculation means for calculating an image statistic from an input binary Image, area classification means for performing area classification of the input binary image according to the image statistic and preparing area classification data of the input binary image, and reference data preparing means for preparing reference data to be used in the Markov model encoding, wherein the reference data is composed of a first data portion corresponding to the area classification data and a second data portion which includes the data other than the data of the first data portion.

The above and other objects, features and advantages of the present invention will be apparent from the following description referring to the accompanying drawings which illustrate an example of the preferred embodiment of the present invention.

DESCRIPTION OF THE PREFERRED EMBODIMENT

Figure 1:
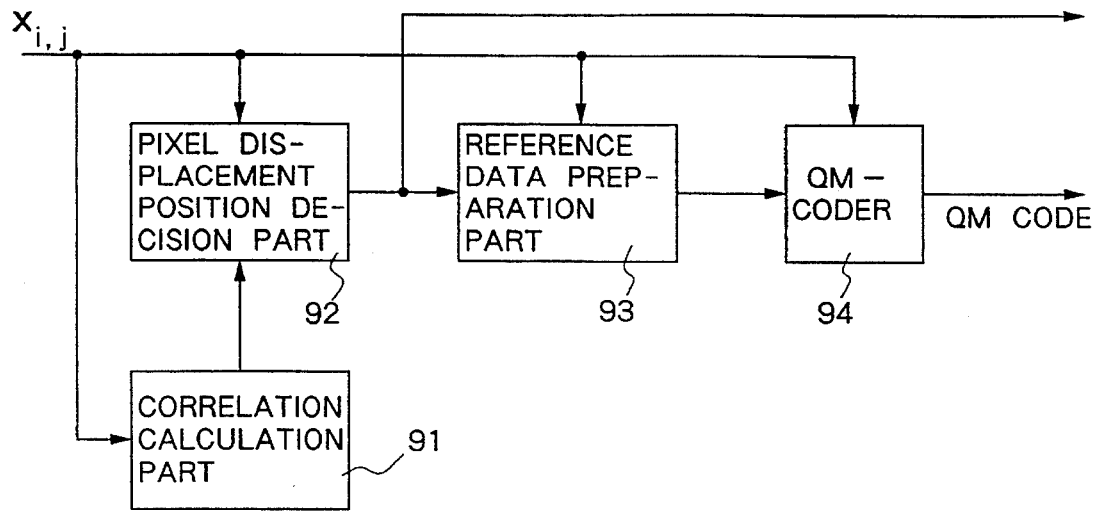
FIG. 1 is a block diagram illustrating a conventional binary image data compression apparatus according to the JBIG method.
Figure 2:
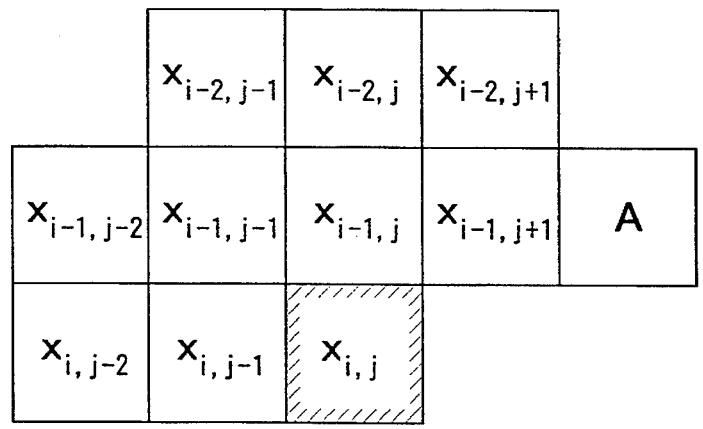
FIG. 2 is a view illustrating positions of reference pixels to be referred to in the Markov model encoding.
Figure 3:
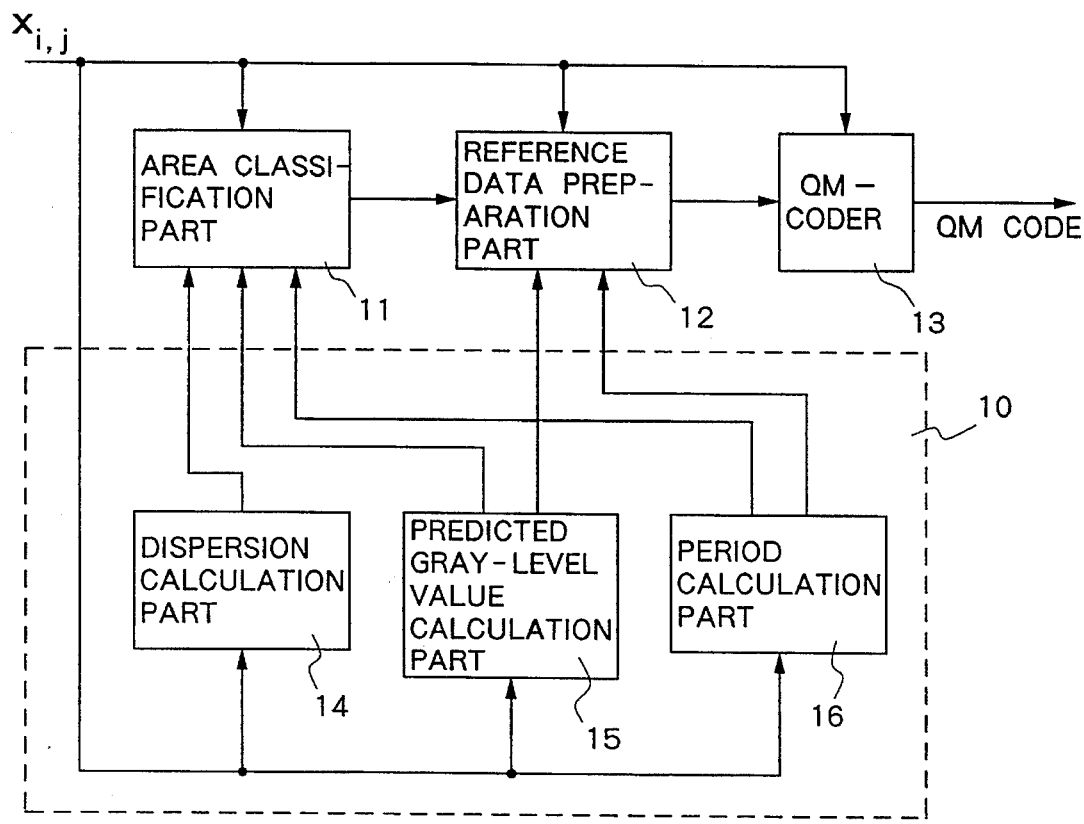
FIG. 3 is a block diagram illustrating the composition of a binary image data compression apparatus of an embodiment of the present invention.

An embodiment of the present invention will next be described with reference to the attached drawings. A binary image data compression apparatus shown in FIG. 3 comprises an image statistic calculation part 10 for calculating an image statistic from inputted binary Image data, an area classification part 11 for performing area classification of the input binary image pixel by pixel based on the calculated image statistic, a reference data preparation part 12 for preparing the reference data to be referred to in the Markov model encoding, and a QM coder 13 for performing the Markov model encoding consulting with the reference data. The image statistic calculation part 10 comprises a dispersion calculation part 14, a predicted gray-level value calculation part 15 and a period calculation part 16. The output from the QM coder 13 represents the encoded output signal of this binary image data compression apparatus. When the reference data preparation part 12 prepares the reference data, the area classification data corresponding to the result of the area classification executed by the area classification part 11 is added to the reference data. The scanning method to be applied to the input binary image of this apparatus is a raster scan method which performs scanning of the image pixel by pixel from the upper left portion of the image. $x_{i,j}$ represents a pixel on the j-th place of the i-th line of the image.

Figure 4:
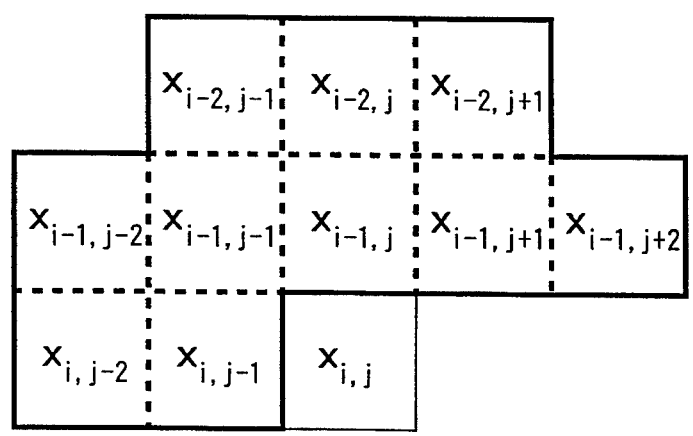
FIG. 4 is a view illustrating the already encoded 10 nearby pixels to be used for the calculation of dispersion.

Before encoding the attentional pixel $x_{j,j}$, the dispersion calculation part 14 counts change points between the already encoded 10 nearby pixels and outputs the number $V_{i,j}$ of the change points. Practically, the dispersion calculation part 14 examines the 10 nearby pixels surrounded by heavy solid lines in FIG. 4 with reference to the attentional pixel $x_{i,j}$ and determines whether there are differences between pixel values across the twelve borders between the nearby pixels for outputting a numeral $V_{i,j}$ which represents the number of borders having different pixel values on both sides thereof. The border between nearby pixels is shown by the heavy dashed lines in the figure.

Figure 5:
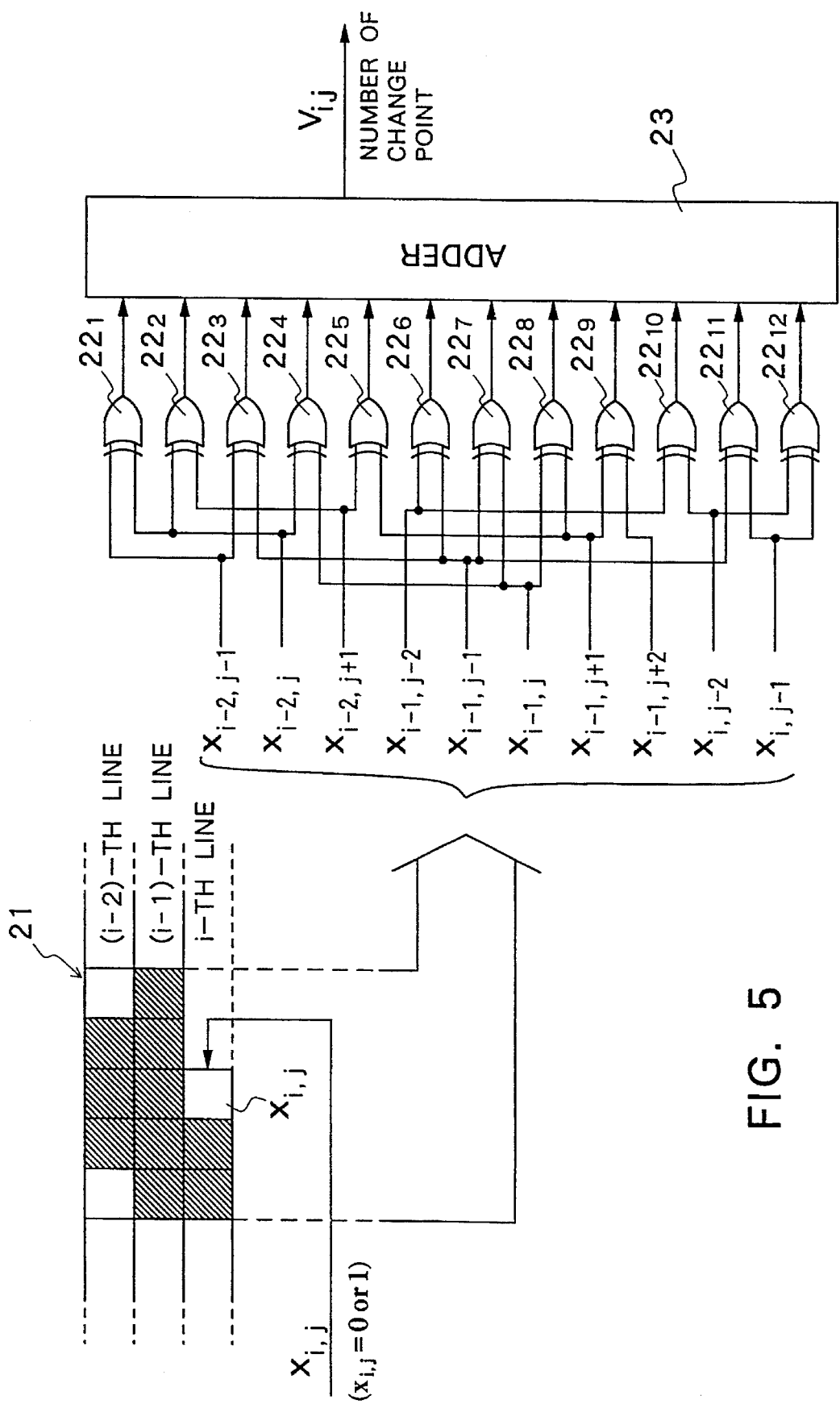
FIG. 5 is a block diagram illustrating the composition of a dispersion calculation part.

FIG. 5 illustrates an example of the composition of the dispersion calculation part 14. The dispersion Calculation part 14 consists of a line memory 21 for storing 10 pixels (pixels marked with oblique lines in the figure) neighboring the attentional pixel $x_{i,j}$ by recording three lines of the input image data, 12 exclusive-OR circuits $22_1$ to $22_{12}$ corresponding to the boundaries between each pair of neighboring pixels, and an adder 23 for counting the number of outputs of the exclusive-OR circuits $22_1$ to $22_{12}$ whose output is "1." Each exclusive-OR circuit receives pixel values of pixels positioned on both sides of the boundary to which the exclusive-OR circuit corresponds. For example, the first exclusive-OR circuit $22_1$ receives the values of pixel $x_{i-2,j-1}$ and pixel $x_{i-2,j}$. If the values of pixel $x_{i-2,j-1}$ and pixel $x_{i-2,j}$ differ from each other, the output of the exclusive-OR circuit $22_1$ is "1" and if the above values of the pixels coincide with each other, the output of the circuit $22_1$ is "0". Since in the same way the outputs of the other exclusive-OR circuits $22_2$ to $22_{12}$ each become "1" when the respective pixel values on both sides of the corresponding boundary differ from each other, the dispersion value $V_{i,j}$, i.e. the number of the change points, is obtained by counting the number of the exclusive-OR circuits whose output is "1" with the adder 23.

The predicted gray-level value calculation part 15 predicts the gray-level value of the attentional pixel $x_{i,j}$ from pixel values of the already encoded pixels around the attentional pixel $x_{i,j}$, and outputs it as the predicted gray-level value $L^*_{i,j}$ of the attentional pixel. An example of the equations for calculating the predicted gray-level value $L^*_{i,j}$ is shown below. The predicted gray-level value $L^*_{i,j}$ is expressed for example in 5 bits.

$$L_{i,j} = \sum_{m,n} x_{i-m,j-n} \tag{1}$$

$$L^*_{i,j} = \frac{L_{i,j} + L_{i,j-1} + L_{i-1,j} + L_{i-1,j-1} + L_{i-1,j+1}}{5} \tag{2}$$

Figure 6:
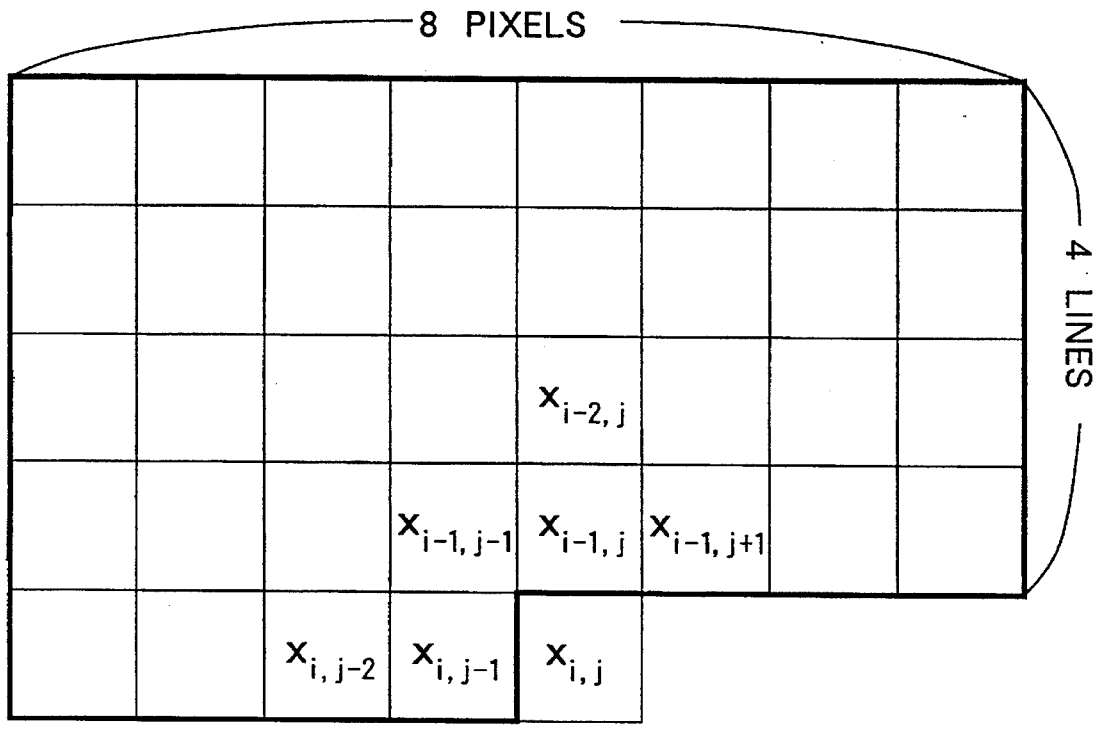
FIG. 6 is a view illustrating an example of peripheral area pixels to be used for the calculation of a predicted gray-level value.

Here, $x_{i-m,j-n}$ represents an already encoded peripheral pixel other than the attentional pixel $x_{i,j}$, its pixel value being is "0" or "1". FIG. 6 shows an example of the disposition of peripheral pixels to be used for calculating $L_{i,j}$ of equation (1). 36 pixels within the heavy solid lines are used for the calculation of $L_{i,j}$.

Figure 7:
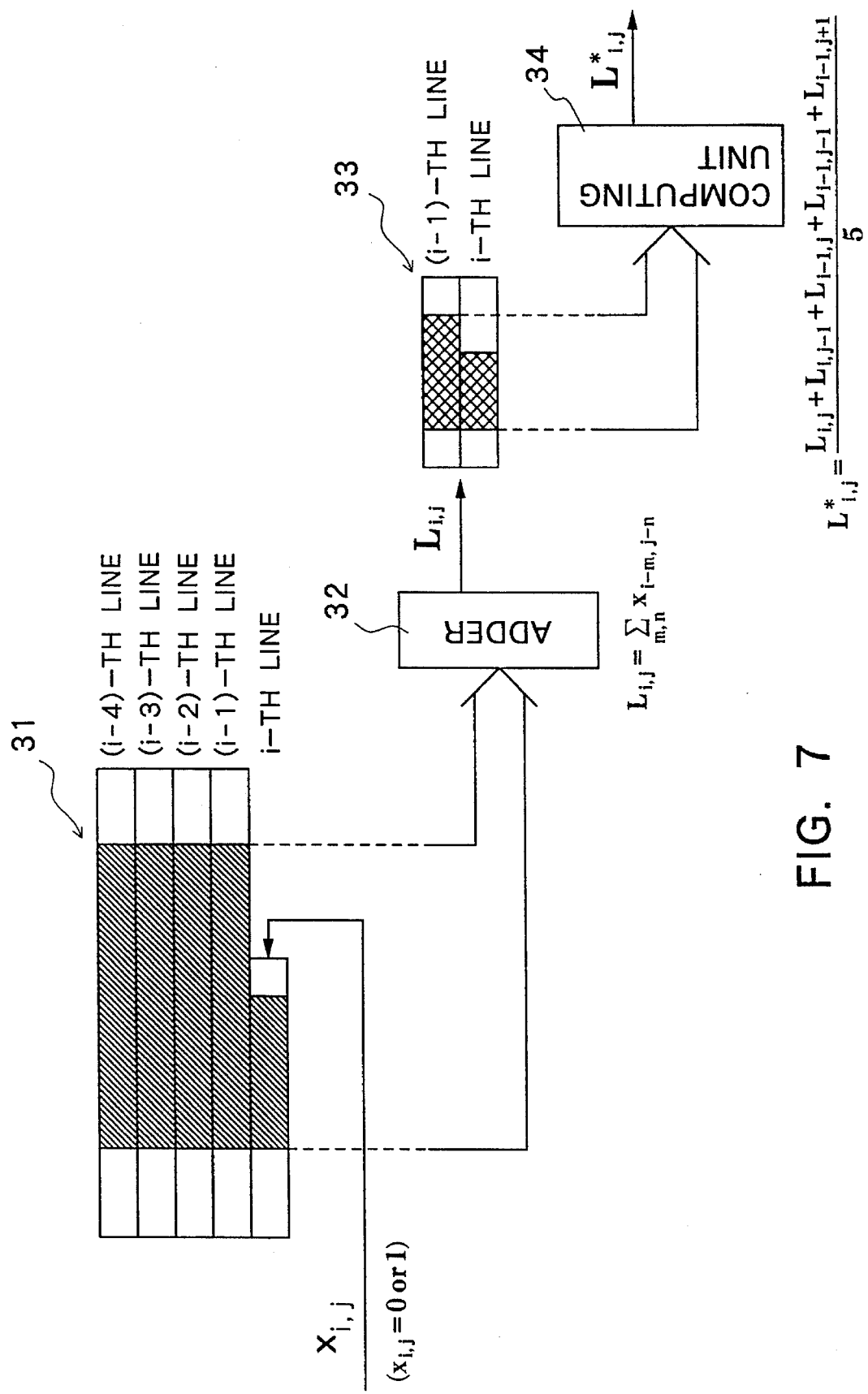
FIG. 7 is a block diagram illustrating the composition of a predicted gray-level value calculation part.

FIG. 7 is a block diagram illustrating an example of the composition of the predicted gray-level value calculation part 15. The predicted gray-level value calculation part 15 is composed of a line memory 31 for storing the above 36 peripheral pixels (pixels marked with oblique lines in the figure) around the attentional pixel $x_{i,j}$ by recording five lines of the input image data, an adder 32 for counting $L_{i,j}$ by adding pixel values of the peripheral 36 pixels in accordance with equation (1), a line memory 33 for storing a calculated value of $L_{i,j}$, and a computing unit 34 for computing the predicted gray-level value $L^*_{i,j}$ in accordance with equation (2).

Figure 8:
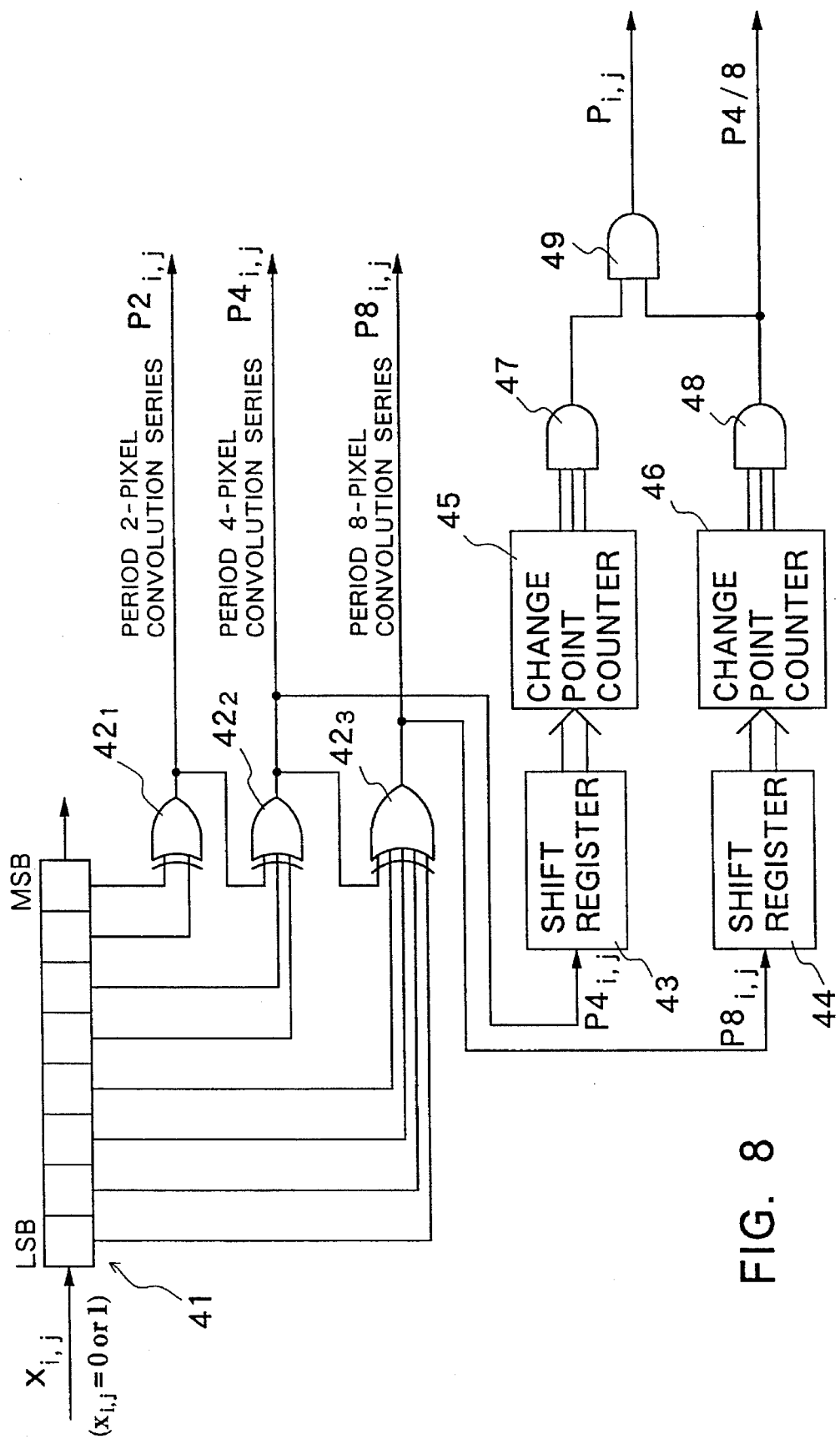
FIG. 8 is a block diagram illustrating the composition of a period calculation part.

The period calculation part 16 operates for calculating the periodicity of pixels based on encoded peripheral pixels and outputs the obtained data of the pixel period. FIG. 8 is a block diagram illustrating an example of the composition of the period calculation part 16. The period calculation part 16 includes an 8-bit shift register 41. The value of the attentional pixel $x_{i,j}$ is inputted in order into the least significant bit (LSB) of the 8-bit shift register 41. An output signal from the 2 bits of the most significant bit (MSB) side of the shift register 41 is connected to a first exclusive OR circuit $42_1$ for calculating a convolution series $P2_{i,j}$ of a period 2 pixel. An output from the next 2 bits calculated from the MSB side of the shift register 41 and an output from the first exclusive OR circuit $42_1$ are inputted to a second exclusive OR circuit $42_2$ for calculating a convolution series $P4_{i,j}$ of a period 4 pixel. An output from the 4 bits on the LSB side of the shift register 41 and an output from the second exclusive-OR circuit $42_2$ are connected to a third exclusive-OR circuit $42_3$ for calculating a convolution series $P8_{i,j}$ of a period 8 pixel.

The convolution series $P4_{i,j}$ of the period 4 pixel and the convolution series $P8_{i,j}$ of the period 8 pixel are supplied to shift registers 43, 44 respectively, and in the output side of the shift registers 43, 44, change point counters 45, 46 are provided for counting the number of change points in each convolution series $P4_{i,j}$, $P8_{i,j}$ respectively. In other words, the change point counter 45 calculates the number of change points from $P4_{i,j}$ to $P4_{i,j-7}$ including both endpoints. The output signal of each change point counter 45, 46 consists of 3 bits. AND circuits 47, 48 are provided for receiving 3-bit output from the change point counters 45, 46, respectively, and further, an AND circuit 49 is provided for receiving the output signal from the AND circuits 47, 48. The output signal $P_{i,j}$ of the last AND circuit 49 indicates whether or not the pixel has a period. A signal $P_{i,j}$ of "0" indicates that the pixel has a period, and a signal $P_{i,j}$ of "1" indicates that the pixel has no period. The output of the AND circuit 48 on the 8-pixel period side is a P4/8 signal. The value of the P4/8 signal indicates the period of a pixel, a value of "0"

indicating the period is a 8-pixel period, and a value of "1" indicating the period is a 4-pixel period. As a result, if there is no change point in 4 consecutive pixels in the convolution series $P4_{i,j}$ or in 8 consecutive pixels in the convolution series $P8_{i,j}$, the period calculation part 16 judges that each pixel series corresponding to the pixel $x_{i,j}$ has a period of 4 pixels or 8 pixels accordingly.

An area classification part 11 will next be described. The area classification part 11 classifies, with reference to an attentional pixel $x_{i,j}$ positioned at a j-th place of an i-th line of an input image, the type of the area in which the pixel $x_{i,j}$ is located. Factors used in this classification activity are the number of change points $V_{i,j}$ calculated by the dispersion calculation part 14, the predicted gray-level value $L^*_{i,j}$ computed by the predicted gray-level value calculation part 15 and the pixel period data counted by the period calculation part 18. By the classification, it is judged whether the objective pixel is in the homogeneous-area or the edge-area of the image, and whether the objective pixel is in the image area in which the pixel period is present or in the area in which the pixel period is absent. However, since it is possible to know, immediately after referring to the output signal of the period calculation part 18, whether or not the objective pixel is in the pixel period existing area, the main activity of the area classification part 11 is to classify whether the objective pixel is in the homogeneous-area or in the edge-area.

Figure 9:
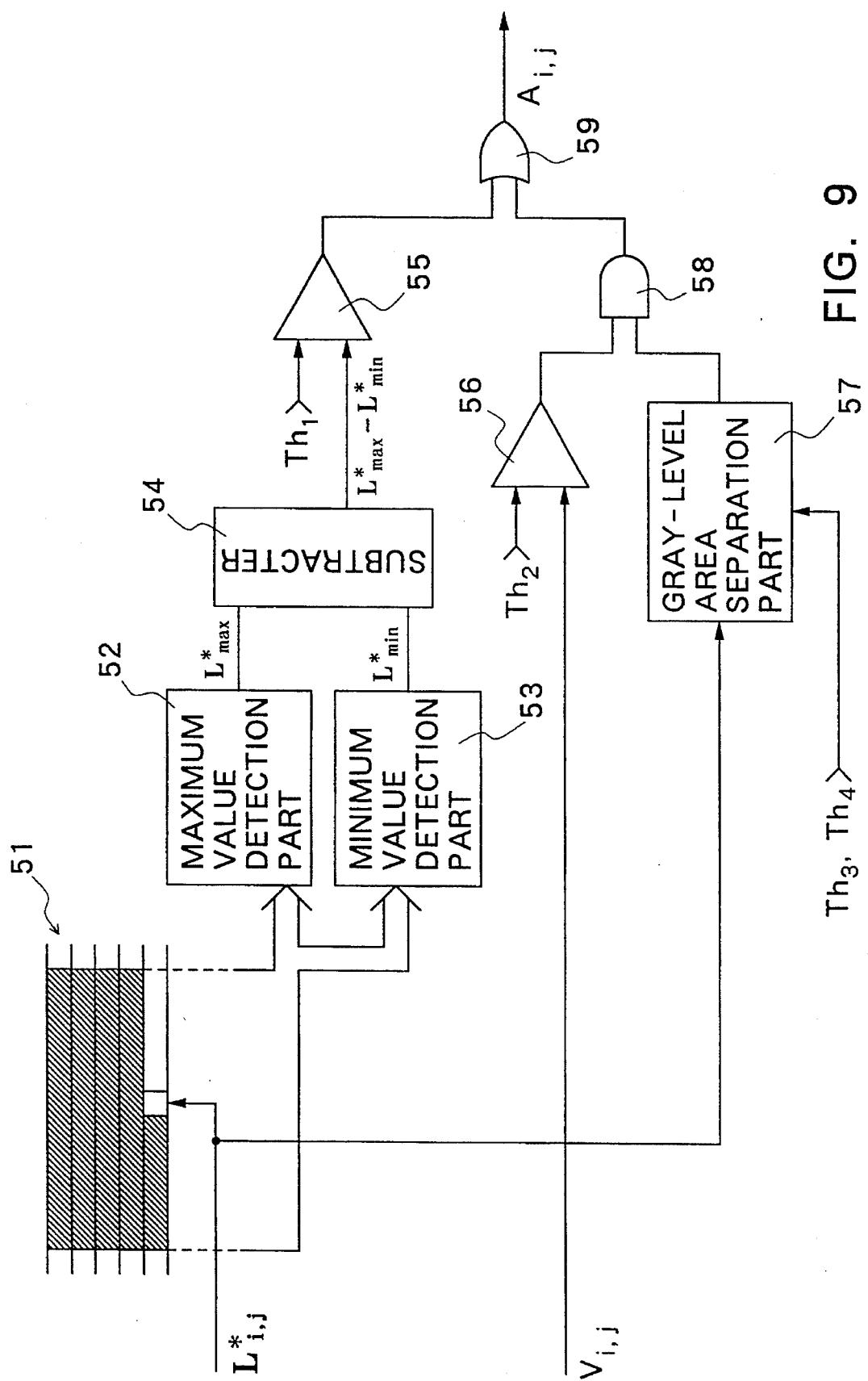
FIG. 9 is a block diagram illustrating the composition of the principal portion of an area classification part.

FIG. 9 is a block diagram illustrating an example of the composition of the principal part of the area classification part 11. The area classification part 11 includes a line memory 51 for storing a predicted gray-level value $L^*_{i,j}$ inputted from the predicted gray-level value calculation part 15, a maximum value detecting part 52 and a minimum value detecting part 53 for detecting the maximum value $L^*_{max}$ and minimum value $L^*_{min}$ of the min predicted gray-level values stored in the line memory 51, respectively. The area classification part 11 further includes a subtracter 54 for calculating the difference between the maximum value $L^*_{max}$ and the minimum value $L^*_{min}$, a first comparator 55 for comparing an output signal of the subtracter 54 with a first threshold value $Th_1$, and a second comparator 56 for comparing the number of change points $V_{i,j}$ received from the dispersion calculation part 14 with a second threshold value $Th_2$. The output of the first comparator 55 is "1" if $L^*_{max} - L^*_{min} > Th_1$, and otherwise it is "0." The output of the second comparator 56 is "0" if $V_{i,j} > Th_2$, and otherwise it is "1." Further, the area classification part 11 has a gray-level area separator 57 for judging whether the predicted gray-level value $L^*_{i,j}$ is between a third threshold value $Th_3$ and a fourth threshold value $Th_4$. The output of the gray-level area separator 57 is "1" if $Th_3 < L^*_{i,j} \leq Th_4$, and otherwise it is "0." The outputs from the second comparator 56 and the gray-level area separator 57 are inputted into an AND circuit 58, and the outputs from the first comparator 55 and the AND circuit 58 are inputted into an OR circuit 59. The output $A_{i,j}$ of the OR circuit 59 indicates whether the area is the homogeneous-area or the edge-area, and also indicates the homogeneous-area with $A_{i,j}$ "0" and the edge-area with $A_{i,j}$ "1".

An area classification procedure to be followed by the area classification part 11 will next be described. When an attentional pixel $x_{i,j}$ is encoded by the QM coder 13 of the apparatus of the present embodiment, the area classification part 11 first performs the area classification of the attentional pixel $x_{i,j}$. The area classification part 11 receives the change point number $V_{i,j}$, the predicted gray-level value $L^*_{i,j}$, and the pixel period data pixel by pixel. The area classification part 11 first finds a maximum value $L^*_{max}$ and a minimum value $L^*_{min}$ from among the predicted gray-level $L^*_{i,j}$ of the attentional pixel $x_{i,j}$ and predicted gray-level values $L^*_{i-m,j-n}$ (m=0, 1, ..., n=0, 1 ..., but $m^2+n^2 \neq 0$) of the already encoded peripheral pixels, and obtains the difference between the maximum value $L^*_{max}$ and the minimum value $L^*_{min}$. The area classification part 11 performs the area classification of the attentional pixel based on the above difference in accordance with the following conditions. The output of the first comparator 55 represents the result of the above area classification.

If $L^*_{max} - L^*_{min} > Th_1$, then the input pixel $x_{i,j}$ is classified as an edge-area.

If $L^*_{max} - L^*_{min} \leq Th_1$, then the input pixel $x_{i,j}$ is a candidate for the homogeneous-area.

(where $Th_1$ is the first threshold value and $x_{i,j}$ is the attentional pixel).

A pixel classified as a homogeneous-area candidate according to the above classification conditions is in an area such as a homogeneous gray-level area of the binary pseudo-halftone images processed by the error diffusion method or the ordered dither method, or is in an area of such fine reticular dots with high resolution, a character background, a thick line or in the internal area of a character. A pixel classified as an edge-area is in an area such as a character, a diagram, an area of thin reticular dots with low resolution, or an edge portion of a pseudo-halftone image.

According to the characteristics of the homogeneous gray-level area of pseudo-halftone images, the amount of change ($L^*_{max} - L^*_{min}$) of the predicted gray-level values to be obtained according to the above classification conditions is reduced, and other than the number of change points between white and black points, grows larger. This is because, when the homogeneous gray-level area of halftone images such as photographs is processed to a binary state, white and black pixels are dispersed homogeneously producing a number of white or black isolated points. However, if an area in which a large number of change occurs from a white to a black point or vice versa is deemed a homogeneous-area, it will cause trouble in subsequent encoding activity, and hence it becomes necessary to exclude these areas from the classified homogeneous-area. Therefore, in order to exclude a binary texture area from attentional pixels $x_{i,j}$s classified as candidates for the homogeneous-area, the correction of area classification is performed based on the number of change points obtained from neighboring 10 pixels. Practically, when the attentional pixel is classified as a candidate for a homogeneous-area, separation of a homogeneous-area and an edge-area is executed by using second to fourth threshold values $Th_2$ to $Th_4$ previously determined, the number of change points $V_{i,j}$ calculated by the dispersion calculation part 14 and a predicted gray-level value $L^*_{i,j}$ in accordance with the following conditions:

If $V_{i,j} \leq Th_2$, and $Th_3 < L^*_{i,j} \leq Th_4$, the pixel is classified as an edge-area.

Otherwise, tile pixel is classified as a homogeneous-area.

In this way, the pixel is classified as belonging to the edge-area or to the homogeneous-area, and thus, classified result $A_{i,j}$ is outputted.

The area classification part 11 classifies the edge-area and homogeneous-area based on the pixel period data received from the period calculation part 16 according to the absence or presence of the pixel period. As a result, the binary image is classified on a pixel basis into areas of 4 types I to IV as shown below.

(I) pixel period present, homogeneous-area→ordered dither method image, fine reticular dots;

(II) pixel period absent, homogeneous-area→error diffusion image, background, thick line and internal part of a character;

(III) pixel period present, edge-area→thin reticular dots;

(IV) pixel period absent, edge-area→character, diagram, edge-area of pseudo-halftone images.

In this way, the area classification part 11 performs area classification pixel by pixel, and the result of the area classification is sent to the reference data preparation part 12 as the classified data.

Figure 11:
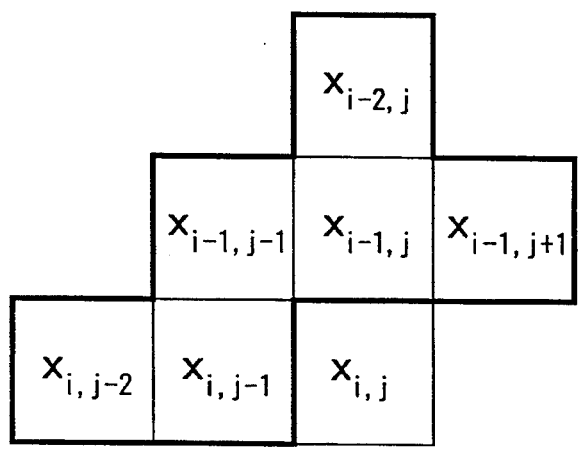
FIG. 11 is a view illustrating an example of fixed reference pixels in the reference data.
Figure 10:
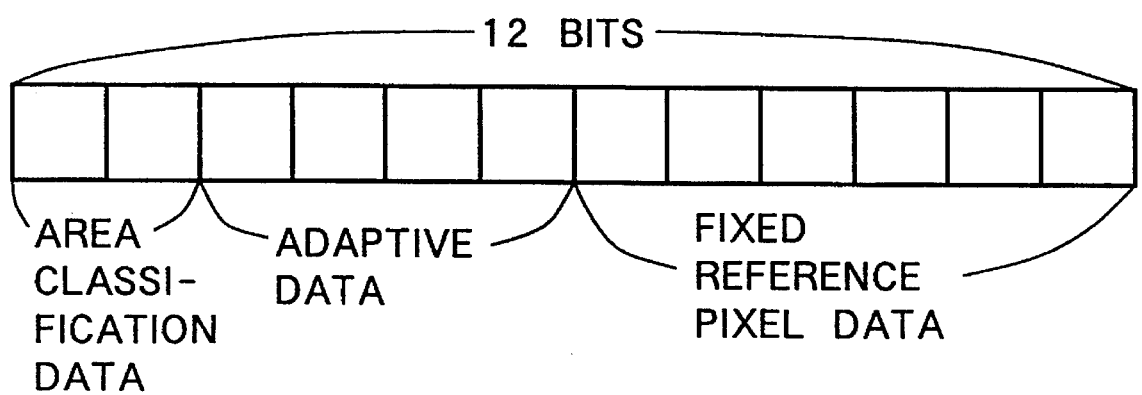
FIG. 10 is a view illustrating an example of the composition of the reference data to be referred to in the Markov model encoding.

The reference data preparation part 12 will next be described. The reference data preparation part 12 prepares the reference data to be used in the Markov model encoding and receives input pixel signals, classified data from the area classification part 11, and in addition, a signal P4/8 representing the period of a pixel sent from the period calculation part 16 and a predicted gray-level value $L^*_{i,j}$ from the predicted gray-level value calculation part 15. In FIG. 10, there is shown an example of the composition of the reference data to be prepared. The reference data represented has a 12-bit width and consists of 2 bits of area classification data, a total of 6 bits of pixel data for 6 pixels neighboring the attentional pixel $x_{i,j}$, and 4 bits of adaptive data. Of the two bits of area classification data, one bit is used for data indicating either a homogeneous-area or an edge-area and the other bit is used for data indicating whether the pixel period is present or absent. Six nearby pixels in the vicinity of the attentional pixel are the pixels ($x_{i-2,j}$, $x_{i-1,j-1}$, $x_{i-1,j}$, $x_{i-1,j+1}$, $x_{i,j-2}$, $x_{i,j-1}$) enclosed by heavy solid lines in FIG. 11, and are to be included in the reference data regardless of the result of the area classification. Hereinafter, these 6 nearby pixels are referred to as the fixed reference pixel data. On the other hand, the adaptive data is the data whose contents varies depending upon the result of classification. In other words, corresponding to the area classification data which belongs to any one of the above cases I to IV, the adaptive data is given as follows:

Case (I) pixel period present, homogeneous-area→data of k number of period pixels and (4-k)-bit quantized data of predicted gray-level value $L^*_{i,j}$.

Case (II) pixel period absent, homogeneous-area→4-bit quantized data of predicted gray-level value $L^*_{i,j}$.

Case (III) pixel period present, edge-area→data of k number of period pixels and data of nearby (4-k) pixels.

Case (IV) pixel period absent, edge-area→4 nearby pixels other than fixed reference pixels.

Here, the above nearby 4 pixels other than the fixed reference pixels refers to, for instance, pixels $x_{i-1,j-2}$, $x_{i-2,j-1}$, $x_{i-2,j+1}$, $x_{i-1,j+2}$. The period pixel refers to the pixel which shows a strong period correlation with the attentional pixel $x_{i,j}$ when the periodicity of the image from the encoded nearby pixels is analyzed. A numeral k is an integer between and including 0 and 4, and in the above four cases, the number of pixels to be applied as the period pixel is varied according to the intensity of the period correlation. Further, the quantized data of the predicted gray-level value $L^*_{i,j}$ is produced by compressing the information of encoded pixels on the peripheral area.

Figure 12:
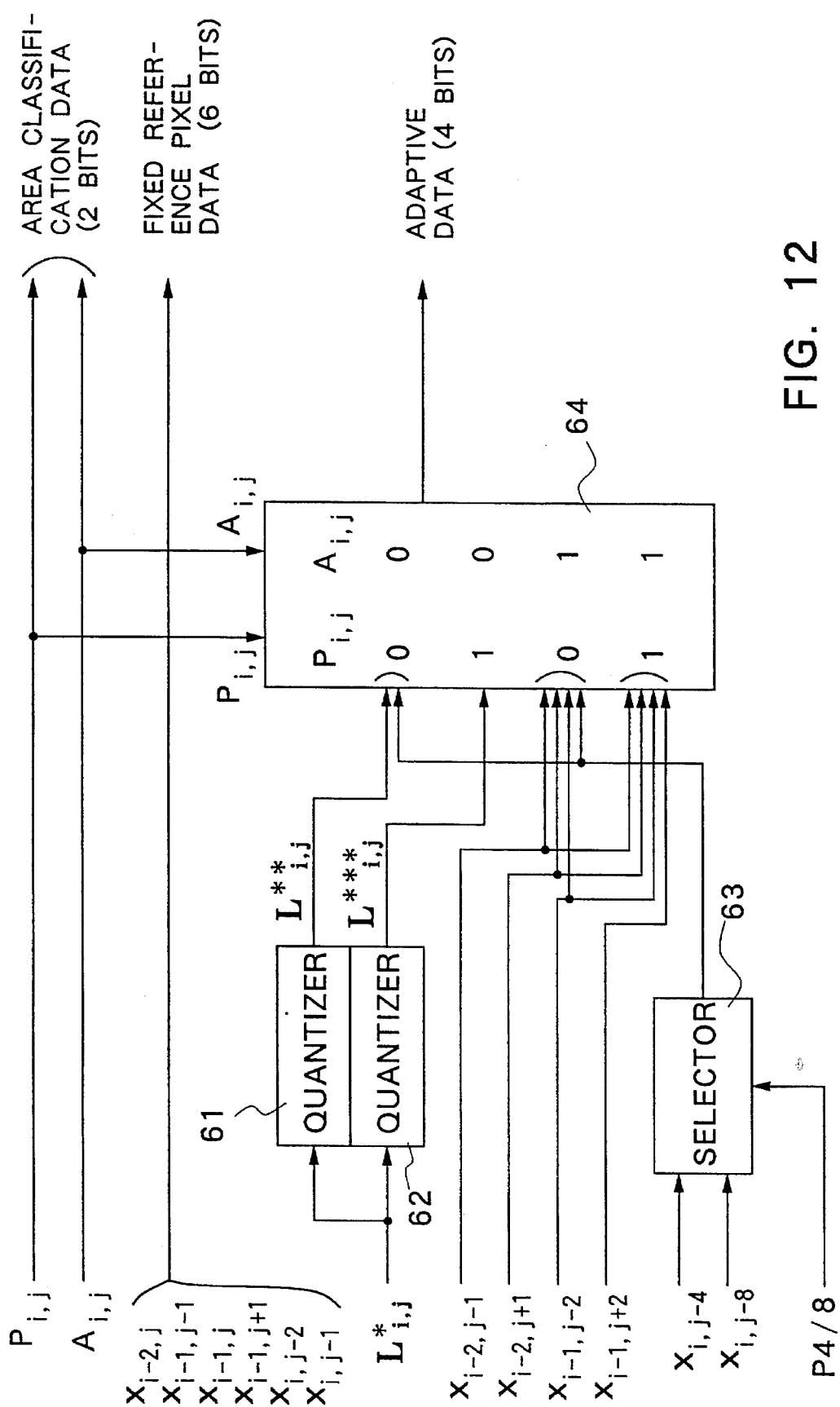
FIG. 12 is a block diagram illustrating the composition of the principal part of a reference data preparation part.

A concrete example of the composition of the reference data preparation part 12 will next be described with reference to FIG. 12. The reference data preparation part 12 operates in the case when k is 0 or 1, and receives as input data the area classification data (2 bits) from the area classification part 11, fixed reference pixel data (6 bits) predicted gray-level value $L^*_{i,j}$ (5-bit width) signal P4/8, and data ($x_{i-2,j-1}$, $x_{i-2,j+1}$, $x_{i-1,j-2}$, $x_{i-1,j+2}$, $x_{i,j-4}$, $x_{i,j-8}$) of nearby pixels other than the fixed reference pixel. Of this data, the area classification data and fixed reference pixel data are outputted from the reference data preparation part 12 without change. The reference data preparation part 12 comprises a first and a second quantizer 61, 62 for further quantizing the predicted gray-level value $L^*_{i,j}$, a selector 63 for selecting either pixel $x_{i,j-4}$ or $x_{i,j-8}$ depending on the signal P4/8, and an adaptive data selection part 64 for producing adaptive data corresponding to the value of the area classification data. The first and second quantizers 61 and 62 convert the predicted gray-level value $L^*_{i,j}$ to $L^{}_{i,j}$ of 3-bit width and $L^{*}_{i,j}$ of 4-bit width, respectively. The selector 63 is structured so as to select pixel $x_{i,j-8}$ when the signal P4/8 is "0" and select pixel $x_{i,j-4}$ when the signal P4/8 is "1." On the other hand, the adaptive data selection part 64 is structured so as to select input signals as shown in equations (1) to (4) below corresponding to values of $P_{i,j}$ and $A_{i,j}$. Pixel $x_{i,j-4}/x_{i,j-8}$ is selected one from $x_{i,j-4}$ and $x_{i,j-8}$ by the selector 63.

(1) if $P_{i,j}=0$, $A_{i,j}=0$; input signal $L^{**}_{i,j}$ (3 bits), $x_{i,j-4}/x_{i,j-8}$;
(2) if $P_{i,j}=1$, $A_{i,j}=0$; input signal $L^{***}_{i,j}$ (4 bits);
(3) if $P_{i,j}=0$, $A_{i,j}=1$; input signal $x_{i-2,j-1}$, $x_{i-2,j+1}$, $x_{i-1,j-2}$, $x_{i,j-4}/x_{i,j-8}$;
(4) if $P_{i,j}=1$, $A_{i,j}=1$; input signal $x_{1-2,j-1}$, $x_{i-2,j+1}$, $x_{i-1,j-2}$, $x_{i-1,j+2}$.

By structuring the reference data preparation part 12 as shown above, the area classification data corresponding to the result of area classification performed by the area classification part 11 is added to the reference data, and the data which represents the data of nearby pixels or the state of peripheral area pixels are adaptively added to the reference data corresponding to the area classification data. The reference data outputted from the reference data preparation part 12 is inputted to the QM coder 13, and successively the QM coder 13 performs encoding of the reference data, i.e., encoding of the attentional pixel $x_{i,j}$.

As is clear from the above description, the present embodiment calculates a structural statistic of images for performing the area classification of the image per pixel and exercises adaptive Markov model data encoding per pixel corresponding to the area classification result of each pixel. Consequently, the data compression ratio is greatly improved with this method compared with a case employing the conventional JBIG method which uses only already encoded nearby pixels as reference data. Since the method of the present embodiment changes reference data to be used for the Markov model data encoding depending upon the area classification data, it is possible to perform the optimum encoding of the data and improve the overall data compression ratio corresponding to the case whether the image is a simple binary image such as a diagram or a pseudo-halftone image produced by the ordered dither method or error diffusion method. In addition, with the method of the present embodiment, it is possible to change the reference data even on the line of the image, with the advantage that there is no need for concern about tile type of input binary images. Further, computing the structural statistic of the image with this method is conducted more simply than computing the correlation of each pixel with pixels of the peripheral area or calculating Markov model entropy for each pixel, thereby enabling the use of small-scale hardware. Accordingly, the method allows an overall reduction in cost compared with a case employing the conventional method.

Next will be described the result of a simulation performed with reference to the present embodiment. This simulation is performed by using a mixed image consisting of 1024×640 pixels composed by placing two images right and left on a plane, one being a binary image consisting of 512×640 pixels obtained by reducing to 1/16 in size a portrait made with a high-definition color standard image SCID (Standard Color Image Data) and by processing the brightness component thereof by the error diffusion method, and the other being an image prepared by cutting 512×640 pixels from the test chart No. 7 of CCITT. Through area classification of tile mixed image for simulation use, the area is classified into two areas including a homogeneous-area with no pixel period and an edge-area with no pixel period. The reference data is then prepared and adopted by excluding the bit $P_{i,j}$ which represents the presence or absence of the pixel period from the above 12-bit reference data. More particularly, the reference data includes 11 bits in total consisting of 1 bit of area classification data, 4 bits of adaptive data, and 6 bits of fixed reference pixels. By using this reference data, the Markov model encoding is applied in $2^{11}$ (=2048) ways. In other words, in order to verify effectiveness of the present invention for mixed images, the number of states is limited to $2^{11}$ ways.

The Markov model entropy H is then calculated in accordance with the following equation for three models. These models are: a model employing the conventional method using 11 nearby pixels as the reference data (Model I), a model in which 1 bit of area classification data and 10 nearby pixels are used as the reference data (Model II), and a model in which 1 bit of area classification data, 6 nearby pixels and 4 bits of adaptive data are used as the reference data (Model III). Here, it is to be noted that the model II and the model III are included in the scope of the present invention.

$$H = \sum_i P(S_i)\{-\Sigma P(x_j|S_i)\log P(x_j|S_i)\} \quad (3)$$

In equation (3), $S_i$ represents a state of the reference data, $x_j$ represents a symbol of the binary image, $P(S_i)$ represents appearance probability of the state $S_i$, and $P(x_j|S_i)$ represents conditional probability for appearance of the above symbol $x_j$ when the state is $S_i$. The Markov model entropy H in each model is as follows:
Model I: H=0.335 bit/pixel.
Model II: H=0.328 bit/pixel.
Model III: H=0.297 bit/pixel.

By comparing the Markov model entropy H of model I of the conventional method and model II of the method of the present invention, the advantageous effect is recognized in performing judgment of the types of area for each pixel and classifying tile areas depending upon the result of the judgment. By comparing the Markov model entropy H of model II with that of model III it can be recognized that more effect is obtained by adaptively changing the reference data corresponding to the data of area judgment. By applying model III in which the reference data is adaptively produced in accordance with the present invention, the Markov model entropy H is reduced by approximately 11% as compared with model I based on the conventional method. This means that the compression ratio of the Markov model encoding activity is improved by approximately 11%.

Next, the simulation is performed with respect to an image which has period characteristics. The image to be used for simulation is prepared by reducing to 1/16 in size the above portrait which is made with a high-definition color standard image SCID and processing the brightness component thereof by the ordered diffusion method for producing a binary image consisting of 512×640 pixels. Through area classification of the image thus prepared for simulation use, the area is classified into two areas including a homogeneous-area in which the pixel period is present and an edge-area in which the pixel period is also present. Then the reference data to be used in the simulation is determined to include 11 bits in total consisting of i bit of area classification data, 4 bits of adaptive data, and 6 bits of fixed reference pixels. The data expressed with the above $A_{i,j}$ is used as the area classification data. Since the reference data is composed of 11 bits, the number of states for the Markov model is $2^{11}$, as in the above simulation. More particularly, in order to verify the effectiveness of the present invention for an image which has period characteristics, the number of states is limited to $2^{11}$.

The Markov model entropy H is calculated in accordance with equation (3) for each of the two models. One model employs the conventional method using 10 nearby pixels and 1 period pixel as the reference data (Model IV), and the other model uses as reference data 1 bit of area classification data, 6 nearby pixels and 4 bits of adaptive data in accordance with the method of the present invention (Model V). One pixel for the period pixel and 3-bit quantized data for the predicted gray-level value $L^*_{i,j}$ are used as the adaptive data. The results obtained are shown below.

Model IV: H=0.176 bit/pixel
Model V: H=0.160 bit/pixel

According to model V of the present invention, the Markov model entropy H is reduced by approximately 9% compared with a case in which model IV based on the conventional method is used. This means that the compression rate in the Markov model encoding activity is improved by approximately 9% according to model V. Further, according to the above embodiment, the number of pixels to be adopted as period pixels can be optionally selected from 0 to 4. The Markov model entropy H is calculated on the condition that k is 2 (model VI), that is, the Markov model entropy H is calculated on the premise that the 4-bit adaptive data has 2 bits of period pixels and 2-bit quantized data of the predicted gray-level value $L^*_{i,j}$. As a result with this method H= 0.142 bit/pixel is obtained with a reduction of about 19% of the Markov model entropy compared with the case of the conventional method, which is represented by model IV. As described above, with reference to the image which has period characteristics, it is clear that the compression ratio in Markov model encoding is greatly improved by using several period pixels having a strong correlation with the attentional pixel as the adaptive data in the reference data.

It is to be noted that variations and modifications of the method and apparatus for binary image data compression disclosed herein will be evident to those skilled in the art. It is intended that all such modifications and variations be included within the scope of the appended claims.

What is claimed is:

1. A method of data compression for a binary image, comprising:

a first step of calculating an image statistic from an input binary image;

a second step of performing area classification of said input binary image according to said image statistic and preparing area classification data; and a third step of producing reference data to be used in Markov model encoding;

said reference data is composed of a first data portion corresponding to said area classification data and a second data portion comprising a data portion other than said first data portion, said second data portion including at least one value which is selected in accordance with said area classification data from (i) a predicted gray-level value of an attentional pixel calculated from encoded pixels, (ii) a pixel value of the encoded pixel having a strong correlation with said attentional pixel, and (iii) a pixel value of a pixel neighboring said attentional pixel.

2. The method of data compression for a binary image according to claim 1 further comprising a fourth step of performing the Markov model encoding of said input binary image based on said reference data.

3. The method of data compression for a binary image according to claim 1 wherein said area classification is performed for each pixel of said input binary image.

4. The method of data compression for a binary image according to claim 3 further comprising a fourth step of distinguishing a Markov state of each pixel area and performing the Markov model encoding of said pixels based on said reference data.

5. The method of data compression for a binary image according to claim 3 wherein said area classification activity judges whether an attentional pixel is in an edge-area of the image or in a homogeneous-area of the image.

6. The method of data compression for a binary image according to claim 3 wherein said area classification activity judges the presence or absence of a period structure in said input binary image.

7. A method of data compression for a binary image comprising:

a first step of calculating an image statistic from an input binary image;

a second step of performing area classification for each pixel of said input binary image according to said image statistic and preparing area classification data;

a third step of producing reference data to be used in Markov model encoding;

a fourth step of distinguishing a Markov state of each pixel area and performing the Markov model encoding of said pixels based on said reference data; wherein, said reference data is composed of a first data portion corresponding to said area classification data and a second data portion comprising a data portion other than said first data portion, said second data portion is produced in said third step by selecting data from among a plurality of data based on said area classification data, and said second data portion is composed of only pixel values of already encoded pixels neighboring an attentional pixel.

8. A method of data compression for a binary image comprising:

a first step of calculating an image statistic from an input binary image;

a second step of performing area classification for each pixel of said input binary image according to said image statistic and preparing area classification data;

a third step of producing reference data to be used in Markov model encoding;

a fourth step of distinguishing a Markov state of each pixel area and performing the Markov model encoding of said pixels based on said reference data; wherein, said reference data is composed of a first data portion corresponding to said area classification data and a second data portion comprising a data portion other than said first data portion, said second data portion is produced in said third step by selecting data from among a plurality of data based on said area classification data, and said second data portion is a combination of a predicted gray-level value of an attentional pixel calculated from encoded pixels, a pixel value of the encoded pixel having a strong correlation with said attentional pixel, and a pixel value of a pixel neighboring said attentional pixel.

9. A method of data compression for a binary image comprising:

a first step of calculating an image statistic from an input binary image;

a second step of performing area classification for each pixel of said input binary image according to said image statistic and preparing area classification data;

a third step of producing reference data to be used in Markov model encoding;

a fourth step of distinguishing a Markov state of each pixel area and performing the Markov model encoding of said pixels based on said reference data; wherein,.

said reference data is composed of a first data portion corresponding to said area classification data and a second data portion comprising a data portion other than said first data portion, said second data portion is produced in said third step by selecting data from among a plurality of data based on said area classification data, and said second data portion is a combination of a predicted gray-level value of an attentional pixel calculated from encoded pixels, pixel values of a plurality of encoded pixels each having a strong correlation with said attentional pixel, and a pixel value of a pixel neighboring said attentional pixel.

10. An apparatus for data compression of a binary image, comprising:

image statistic calculation means for calculating an image statistic from an input binary image;

area classification means for performing area classification of said input binary image according to said image statistic and producing an area classification data; and reference data preparation means for preparing reference data to be used in Markov model encoding; wherein, said reference data is composed of a first data portion corresponding to said area classification data and a second data portion comprising a data portion other than said first data portion, said second data portion including at least one value which is selected in accordance with said area classification data from (i) a predicted gray-level value of an attentional pixel calculated from encoded pixels, (ii) a pixel value of the encoded pixel having a strong correlation with said attentional pixel, and (iii) a pixel value of a pixel neighboring said attentional pixel.

11. An apparatus for data compression of a binary image according to claim 10 further comprising encoding means for performing the Markov model encoding of said input binary image based on said reference data.

12. An apparatus for data compression of a binary image according to claim 10 wherein said area classification means performs the area classification of said input binary image pixel by pixel.

13. An apparatus for data compression of a binary image according to claim 12 further comprising encoding means for distinguishing the Markov state of each pixel area and performing the Markov model encoding of said pixel based on said reference data.

* * * * *

UNITED STATES PATENT AND TRADEMARK OFFICE
CERTIFICATE OF CORRECTION

PATENT NO. : 5,491,564
DATED : February 13, 1996
INVENTOR(S) : Takahiro HONGU

It is certified that error appears in the above-indentified patent and that said Letters Patent is hereby corrected as shown below:

Column 6, line 17, delete "18" and insert therefor --16--.

Column 6, line 23, delete "18" and insert therefor --16--.

Column 7, line 56, delete "tile" and insert therefor --the--.

Column 9, line 54, delete "tile" and insert therefor --the--.

Column 10, line 6, delete "tile" and insert therefor --the--.

Column 10, line 45, delete "tile" and insert therefor --the--.

Signed and Sealed this

Twenty-fifth Day of June, 1996

*Attest:*

BRUCE LEHMAN

*Attesting Officer*    *Commissioner of Patents and Trademarks*